(12) United States Patent
Chapuis et al.

(10) Patent No.: US 7,000,125 B2
(45) Date of Patent: *Feb. 14, 2006

(54) METHOD AND SYSTEM FOR CONTROLLING AND MONITORING AN ARRAY OF POINT-OF-LOAD REGULATORS

(75) Inventors: Alain Chapuis, Morgan Hill, CA (US); Mikhail Guz, Daly City, CA (US)

(73) Assignee: Power-One, Inc., Camarillo, CA (US)

(*) Notice: Subject to any disclaimer, the term of this patent is extended or adjusted under 35 U.S.C. 154(b) by 566 days.

This patent is subject to a terminal disclaimer.

(21) Appl. No.: 10/326,222

(22) Filed: Dec. 21, 2002

(65) Prior Publication Data

US 2004/0123164 A1   Jun. 24, 2004

(51) Int. Cl.
*G06F 1/26*   (2006.01)
(52) U.S. Cl. ........................... 713/300; 713/340
(58) Field of Classification Search ................ 713/300, 713/310, 330, 340
See application file for complete search history.

(56) References Cited

U.S. PATENT DOCUMENTS

| | | |
|---|---|---|
| 3,660,672 A | 5/1972 | Berger et al. |
| 4,194,147 A | 3/1980 | Payne et al. |
| 4,538,073 A | 8/1985 | Freige et al. |
| 4,538,101 A | 8/1985 | Shimpo et al. |
| 4,622,627 A | 11/1986 | Rodriguez et al. |
| 5,053,920 A | 10/1991 | Staffiere et al. |
| 5,073,848 A | 12/1991 | Steigerwald et al. |
| 5,377,090 A | 12/1994 | Steigerwald |
| 5,481,140 A | 1/1996 | Maruyama et al. |
| 5,892,933 A | 4/1999 | Voltz |
| 5,946,495 A | 8/1999 | Scholhamer et al. |
| 5,990,669 A | 11/1999 | Brown |
| 6,191,566 B1 | 2/2001 | Petricek et al. |
| 6,211,579 B1 | 4/2001 | Blair |
| 6,262,900 B1 | 7/2001 | Suntio |
| 6,385,024 B1 | 5/2002 | Olson |
| 6,421,259 B1 | 7/2002 | Brooks et al. |
| 6,429,630 B1 | 8/2002 | Pohlman et al. |
| 2001/0033152 A1 | 10/2001 | Pohlman et al. |
| 2002/0073347 A1 | 6/2002 | Zafarana et al. |

(Continued)

FOREIGN PATENT DOCUMENTS

WO   WO 02/50690   6/2002

OTHER PUBLICATIONS

33702 Microprocessor Power Supply (3.0A), Analog Products MC33702 Fact Sheet; Motorola/Digital dna/Power Management Switching; pp. 1-4.

(Continued)

*Primary Examiner*—Dennis M. Butler
(74) *Attorney, Agent, or Firm*—O'Melveny & Myers LLP

(57) ABSTRACT

A power control system comprises a plurality of POL regulators, at least one serial data bus operatively connecting the plurality of POL regulators, and a system controller connected to the serial data bus and adapted to send and receive digital data to and from the plurality of POL regulators. The serial data bus further comprises a first data bus carrying programming and control information between the system controller and the plurality of POL regulators. The serial data bus may also include a second data bus carrying fault management information between the system controller and the plurality of POL regulators. The power control may also include a front-end regulator providing an intermediate voltage to the plurality of POL regulators on an intermediate voltage bus.

31 Claims, 3 Drawing Sheets

U.S. PATENT DOCUMENTS

| | | |
|---|---|---|
| 2002/0105227 A1 | 8/2002 | Nerone et al. |
| 2003/0122429 A1 | 7/2003 | Zhang et al. |
| 2003/0142513 A1 | 7/2003 | Vinciarelli |
| 2003/0201761 A1 | 10/2003 | Harris |
| 2004/0027101 A1 | 2/2004 | Vinciarelli |
| 2004/0090219 A1 * | 5/2004 | Chapuis ...................... 323/318 |

OTHER PUBLICATIONS

"Motorola Switch Mode Power Supply With Linear Regulatos And High Speed CAN Transceiver", Motorola, Inc. 2002; digital dna; Analog Marketing; Rev. 2.5, Nov. 2002; 33394; Multi-Output Power Supply Semiconductor Technical Data.

"Power Management Solutions For Networking Applications"; Presented by Luc Darmon, Smart Networks Developer Forum 2003—Jun. 4-6 Euro-Disney Paris, France; Motorola digital dna; www.motorola.com/sndf; pp. 1-26.

Preliminary Information 1.5 A Switch-Mode Power Supply With Linear Regulator, 33701; Power Supply Integrated Circuit; Motorola Semiconductor Technical Data; Analog Marketing MC33701/S Rev, 1.0, May 2003; Motorola digital dna; pp. 1-24.

"The 12-C Bus Specification", Version 2.1; Jan. 2000; document order No. 9398 393 40011; Philips Semiconductors; pp. 1-46.

"System Management Bus Specification", Smart Battery System Specifications; Revision 1.1 Dec. 11, 1998; SBS Implementers Forum; Version 1.1; pp. 1-39.

"KEKB Power Supply Interface Controller Module" by A. Akiyama, T. Nakamura, M. Yoshida, T. Kubo, N. Yamamoto and T. Katoh, KEK, High Energy Accelerator Research Organization, 1-1 Ohio, Tsukuba 305, Japan.

"Magnet Power Supply Control System KEKB Accelerators" by T.T. Nakamura, A. Akiyama, T. Katoh, Ta. Kubo, N. Yamamoto, M. Yoshida, KEK, Tsukuba, Japan, International Conference On Accelerator And Large Experimental Physics Control Systems, 1999, Trieste, Italy, pp. 406-408.

"Electronics Produts" by Paul Birman and Sarkis Nercessian, Kepco, Inc. Flushing NY, vol. 37, No. 10, Electronic Products, Mar. 1995; The Engineer's Magazine of Product Technology; Power Supply Special; DSO Samples Single Shots at 10 Gsamples/s Speech Recognition On A Single Chip LCD Has Flat-Panel Benefits At CRT Cost Product Update: High-Performance OP A,PS; A Hearst Business Publication; pp. 1, 5, 33-34.

* cited by examiner

METHOD AND SYSTEM FOR CONTROLLING AND MONITORING AN ARRAY OF POINT-OF-LOAD REGULATORS

BACKGROUND OF THE INVENTION

1. Field of the Invention

The present invention relates to power control systems, or more particularly, to a method and system to control and monitor an array of point-of-load regulators.

2. Description of Related Art

With the increasing complexity of electronic systems, it is common for an electronic system to require power provided at several different discrete voltage and current levels. For example, electronic systems may include discrete circuits that require voltages such as 3 v, 5 v, 9 v, etc. Further, many of these circuits require a relatively low voltage (e.g., 1 v), but with relatively high current (e.g., 100 A). It is undesirable to deliver relatively high current at low voltages over a relatively long distance through an electronic device for a number of reasons. First, the relatively long physical run of low voltage, high current lines consumes significant circuit board area and congests the routing of signal lines on the circuit board. Second, the impedance of the lines carrying the high current tends to dissipate a lot of power and complicate load regulation. Third, it is difficult to tailor the voltage/current characteristics to accommodate changes in load requirements.

In order to satisfy these power requirements, it is known to distribute an intermediate bus voltage throughout the electronic system, and include an individual point-of-load ("POL") regulator, i.e., DC/DC converter, at the point of power consumption within the electronic system. Particularly, a POL regulator would be included with each respective electronic circuit to convert the intermediate bus voltage to the level required by the electronic circuit. An electronic system may include multiple POL regulators to convert the intermediate bus voltage into each of the multiple voltage levels. Ideally, the POL regulator would be physically located adjacent to the corresponding electronic circuit so as to minimize the length of the low voltage, high current lines through the electronic system. The intermediate bus voltage can be delivered to the multiple POL regulators using low current lines that minimize loss.

With this distributed approach, there is a need to coordinate the control and monitoring of the POL regulators of the power system. The POL regulators generally operate in conjunction with a power supply controller that activates, programs, and monitors the individual POL regulators. It is known in the art for the controller to use a multi-connection parallel bus to activate and program each POL regulator. For example, the parallel bus may communicate an enable/disable bit for turning each POL regulator on and off, and voltage identification (VID) code bits for programming the output voltage set-point of the POL regulators. The controller may further use additional connections to monitor the voltage/current that is delivered by each POL regulator so as to detect fault conditions of the POL regulators. A drawback with such a control system is that it adds complexity and size to the overall electronic system.

Thus, it would be advantageous to have a system and method for controlling and monitoring POL regulators within a distributed power system.

SUMMARY OF THE INVENTION

The present invention provides a system and method for controlling and monitoring POL regulators within a distributed power system.

In an embodiment of the invention, the power control system comprises a plurality of POL regulators, at least one serial data bus operatively connecting the plurality of POL regulators, and a system controller connected to the serial data bus and adapted to send and receive digital data to and from the plurality of POL regulators. The serial data bus further comprises a first data bus carrying programming, control and monitoring information between the system controller and the plurality of POL regulators. The serial data bus may also include a second data bus carrying fault management information between the system controller and the plurality of POL regulators. The power control may also include a front-end regulator providing an intermediate voltage to the plurality of POL regulators on an intermediate voltage bus.

The POL control system enables four different modes of operation. In the first operational mode, the POL regulators function independently in the absence of a system controller and without interaction with other POL regulators. In the second operational mode, the POL regulators interoperate for the purpose of current sharing or interleaving in the absence of a system controller. In the third operational mode, the POL regulators operate as an array in which the behavior of each POL regulator and the array as a whole are coordinated by a system controller. Lastly, the fourth operational mode includes both central control using the system controller and local control over certain functionality. This way, the POL regulators operate as an array coordinated by a system controller and also interoperate with each other to perform functions such as current sharing.

A more complete understanding of the method and system for controlling and monitoring a plurality of POL regulators will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention provides a system and method for controlling and monitoring POL regulators within a distributed power system. In the detailed description that follows, like element numerals are used to describe like elements illustrated in one or more figures.

Figure 1:
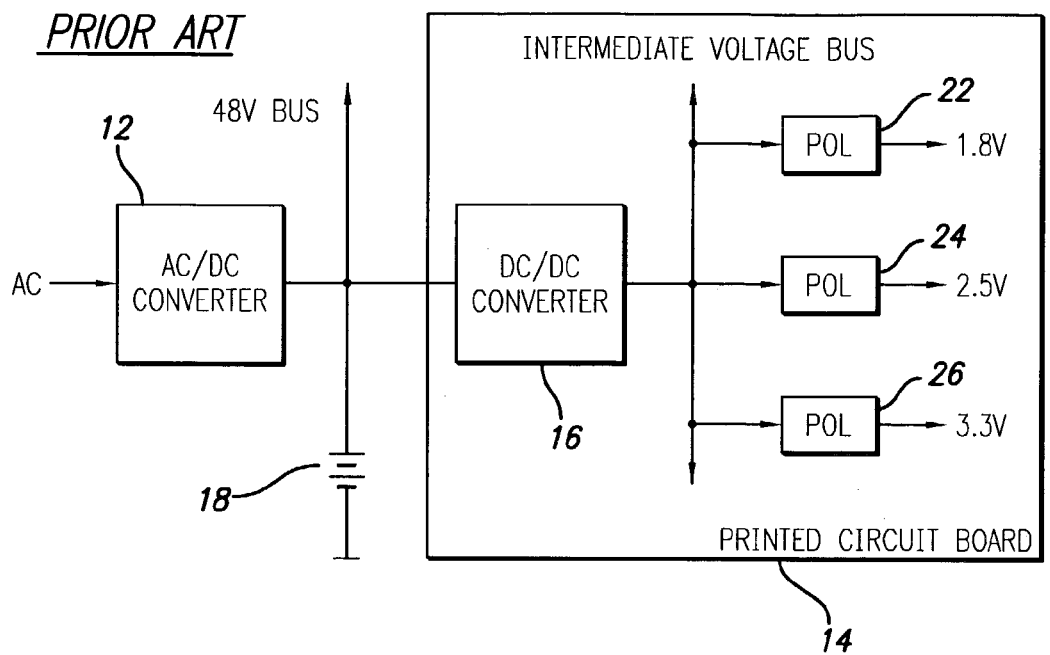
FIG. 1 depicts a prior art distributed power delivery system.

Referring first to FIG. 1, a prior art distributed power delivery system is shown. The prior art distributed power deliver system includes an AC/DC converter 12 that converts the available AC power into a primary DC power source, e.g., 48 volts. The primary DC power source is connected to a primary power bus that distributes DC power to plural electronic systems, such as printed circuit board 14. The bus may be further coupled to a battery 18 providing a back-up power source for the electronic systems connected to the primary power bus. When the AC/DC converter 12 is delivering DC power into the primary power bus, the battery 18 is maintained in a fully charged state. In the event of loss of AC power or fault with the AC/DC converter 12, the battery 18 will continue to deliver DC power to the primary power bus for a limited period of time defined by the capacity of the battery 18.

The printed circuit board 14 may further include a DC/DC converter that reduces the primary bus voltage to an intermediate voltage level, such as 5 or 12 volts. The intermediate voltage is then distributed over an intermediate power bus provided to plural circuits on the printed circuit board 14. Each circuit has an associated point-of-load ("POL") regulator located closely thereby, such as POLs 22, 24, and 26. Each POL regulator converts the intermediate bus voltage to a low voltage, high current level demanded by the electronic circuit, such as 1.8 volts, 2.5 volts, and 3.3 volts provided by POLs 22, 24, and 26, respectively. It should be appreciated that the voltage levels described herein are entirely exemplary, and that other voltage levels could be selected to suit the particular needs of electronic circuits on the printed circuit board 14. By locating the POLs 22, 24, 26 close to their corresponding electronic circuits, the length of the low voltage, high current lines on the printed circuit board 14 are minimized. Moreover, the intermediate power bus can be adapted to carry relatively low current, thereby minimizing power loss due to the line impedance. But, this distributed power delivery system does not provide a way to monitor and control the performance of the POLs 22, 24, 26.

Figure 2:
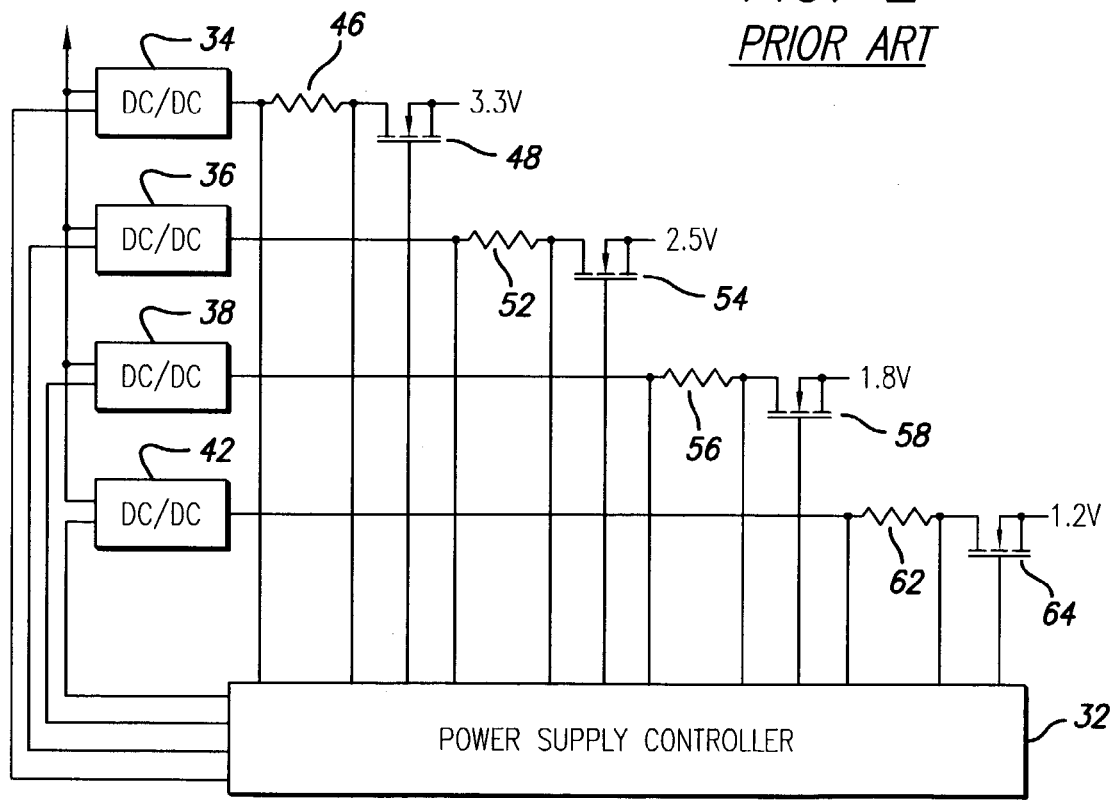
FIG. 2 depicts a prior art POL control system using a parallel control bus.

FIG. 2 illustrates a prior art DC/DC converter control system having a power supply controller 32 and a plurality of DC/DC converters 34, 36, 38, and 42. The DC/DC converters 34, 36, 38, and 42 are each connected to a power bus (as described above with respect to FIG. 1), which provides an input voltage. The DC/DC converters 34, 36, 38, and 42 each provide a low voltage, high current output that passes through respective sensing resistors 46, 52, 56, and 62 and respective switches 48, 54, 58, and 64. The controller 32 provides control signals to the DC/DC converters 34, 36, 38, and 42 via a plurality of six-bit parallel buses that each carry an enable/disable bit and five VID code bits. The VID code bits program the DC/DC converters for a desired output voltage/current level. The controller 32 also monitors the performance of the DC/DC converters 34, 36, 38, and 42 using the sensing resistors 46, 52, 56, and 62. Particularly, the controller 32 monitors the output voltage of each DC/DC converter by detecting the voltage at the output side of the sensing resistor, and monitors the output current through the sensing resistor by detecting the voltage across the sensing resistor. The voltage and current sensing for each DC/DC converter requires two separate lines, so eight separate lines are needed to sense the voltage and current condition of the exemplary four-converter system. Moreover, the controller 32 has a switch enable line connected to the gate terminals of switches 48, 54, 58, and 64, by which the controller 32 can shut off the output from any of the DC/DC controllers 34, 36, 38, and 42.

In an exemplary operation, the controller 32 provides control parameters (e.g., output voltage set-point) to the DC/DC converter 34 via the VID code portion of the six-bit parallel bus. The controller 32 then activates the DC/DC converter 34 via the enable/disable portion of the six-bit parallel bus. Once activated, the DC/DC converter 34 converts the power bus voltage (e.g., 48 volts) into a selected output voltage. The controller 32 then verifies that the output voltage is the desired voltage by measuring the voltage via the voltage monitoring line. If the output voltage is within an acceptable range, it is provided to the load (not shown) by activating the switch 48 via the switch enable line. The controller 32 can then continuously monitor the output voltage and the output current produced by the DC/DC converter 34 by measuring the output voltage via the voltage monitoring line and measuring the voltage drop across the sensing resistor (i.e., the voltage differential between the current monitoring line and the voltage monitoring line). If the controller 32 detects a fault condition of the DC/DC converter 34 (e.g., output voltage drops below a specific threshold), the controller 32 can disable and reset the DC/DC converter. The controller 32 communicates with the other DC/DC converters 36, 38, and 42 in the same manner.

A disadvantage with the control system of FIG. 2 is that it adds complexity and size to the overall electronic system by using a six-bit parallel bus to control each DC/DC converter and a separate three-line output connection to monitor the performance of each DC/DC converter. In other words, the controller 32 utilizes thirty-six separate connections in order to communicate with four DC/DC converters 34, 36, 38, and 42. As the complexity and power requirements of electronic systems increase, the number of connections to the controller will also increase in a linear manner.

Figure 3:
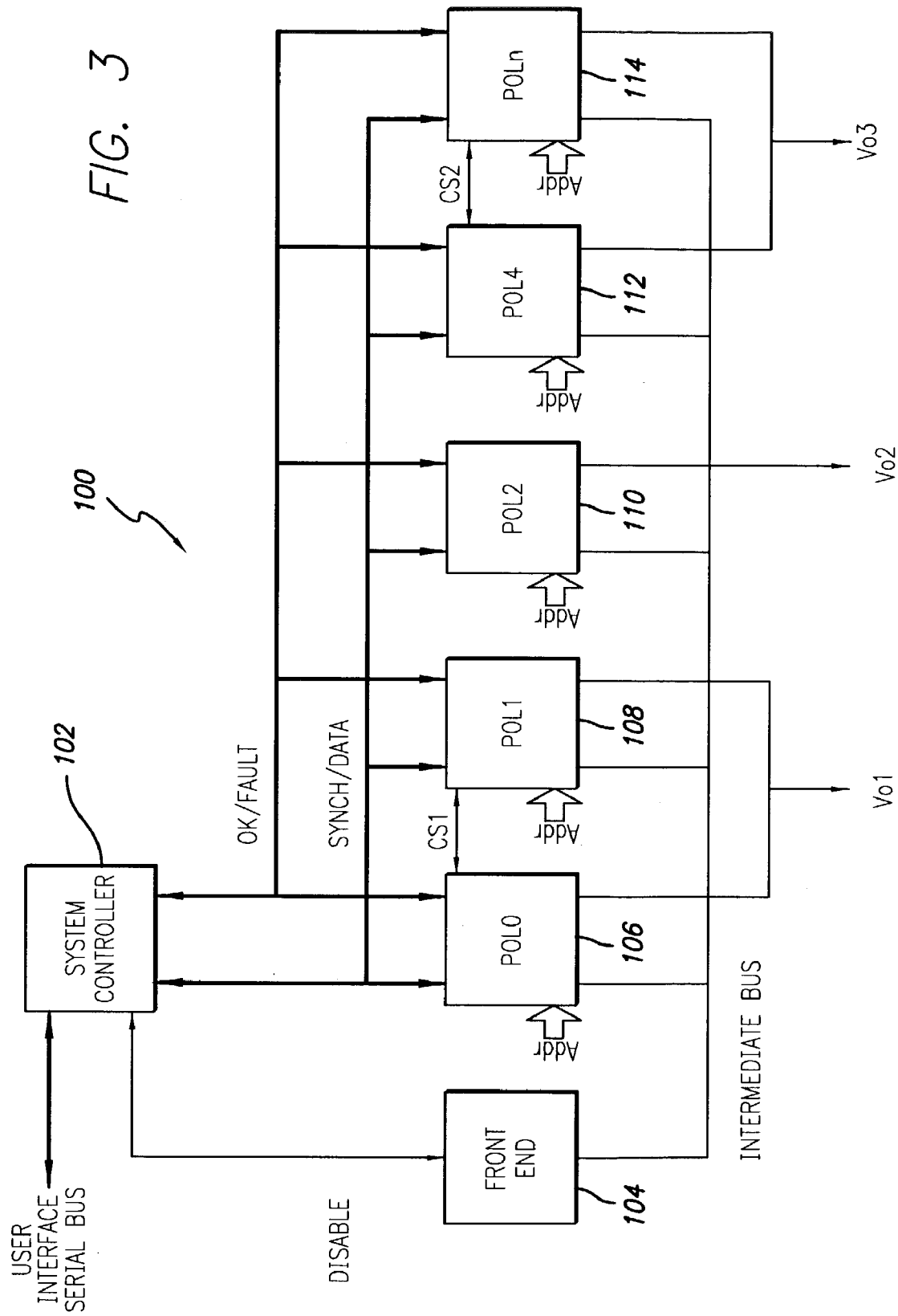
FIG. 3 depicts an exemplary POL control system constructed in accordance with an embodiment of the present invention.

Referring now to FIG. 3, a POL control system 100 is shown in accordance with an embodiment of the present invention. Specifically, the POL control system 100 includes a system controller 102, a front-end regulator 104, and a plurality of POL regulators 106, 108, 110, 112, and 114 arranged in an array. The POL regulators depicted herein include, but are not limited to, point-of-load regulators, power-on-load regulators, DC/DC converters, voltage regulators, and all other programmable voltage or current regulating devices generally known to those skilled in the art. An intra-device interface is provided between individual ones of the POL regulators to control specific interactions, such as current share or paralleling, e.g., current share interface (CS1) provided between POL0 106 and POL1 108, and CS2 provided between POL4 112 and POLn 114. In the exemplary configuration shown in FIG. 3, POL0 106 and POL1 108 operate in parallel mode to produce output voltage $V_{O1}$ with increased current capability, POL2 110 produces output voltage $V_{O2}$, and POL4 112 and POLn 114 operate in parallel mode to produce output voltage $V_{O3}$, though it should be appreciate that other combinations and other numbers of POL regulators could be advantageously utilized.

The front-end regulator 104 provides an intermediate voltage to the plurality of POL regulators over an intermediate voltage bus, and may simply comprise another POL regulator. The system controller 102 and front-end regulator 104 may be integrated together in a single unit, or may be provided as separate devices. Alternatively, the front-end regulator 104 may provide a plurality of intermediate voltages to the POL regulators over a plurality of intermediate voltage buses. The system controller 102 may draw its power from the intermediate voltage bus.

The system controller 102 communicates with the plurality of POL regulators by writing and/or reading digital data (either synchronously or asynchronously) via a uni-directional or bi-directional serial bus, illustrated in FIG. 3 as the synch/data bus. The synch/data bus may comprise a two-wire serial bus (e.g., I²C) that allows data to be transmitted asynchronously or a single-wire serial bus that allows data to be transmitted synchronously (i.e., synchronized to a clock signal). In order to address any specific POL in the array, each POL is identified with a unique address, which may be hardwired into the POL or set by other methods. The system controller 102 also communicates with the plurality of POL regulators for fault management over a second uni-directional or bi-directional serial bus, illustrated in FIG. 3 as the OK/fault bus. By grouping plural POL regulators together by connecting them to a common OK/fault bus allows the POL regulators have the same behavior in the case of a fault condition. Also, the system controller 102 communicates with a user system via a user interface bus for programming, setting, and monitoring of the POL control system 10. Lastly, the system controller 102 communicates with the front-end regulator 104 over a separate line to disable operation of the front-end regulator.

Figure 4:
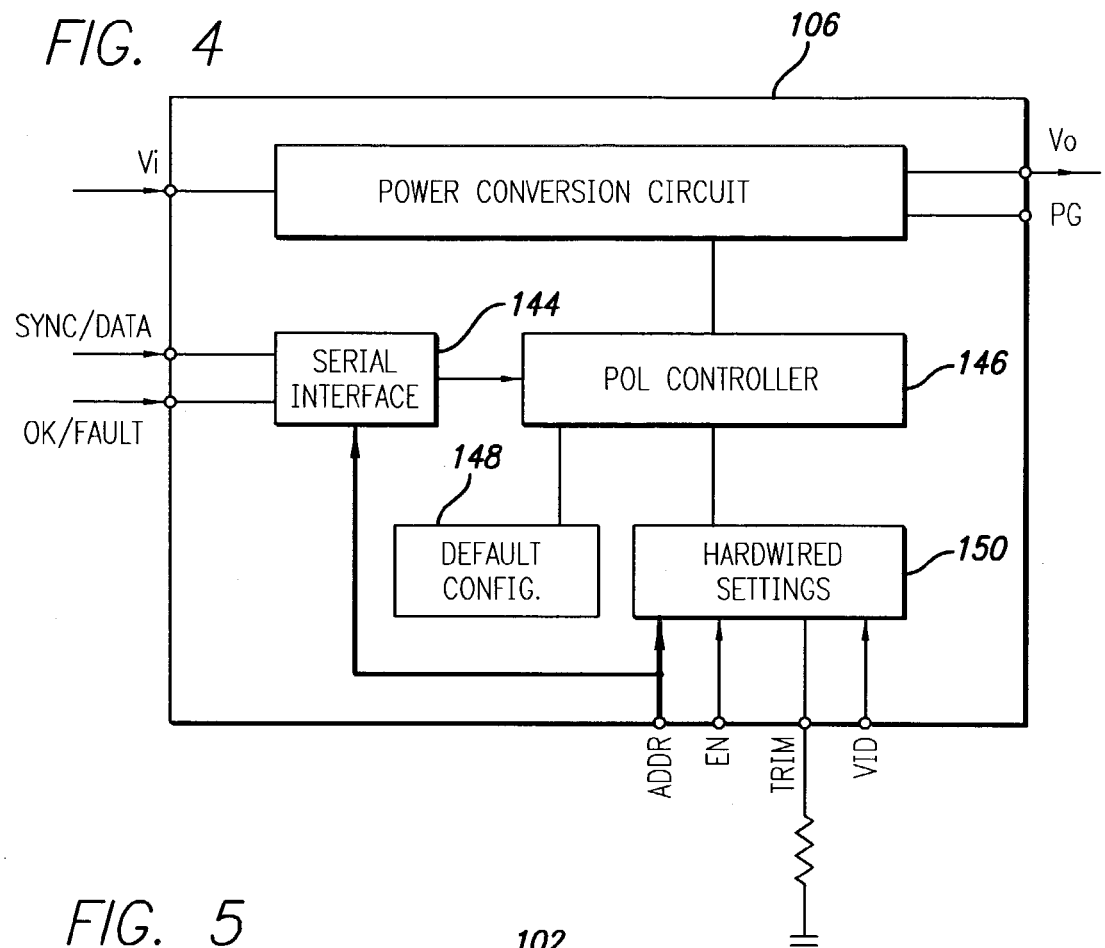
FIG. 4 depicts an exemplary POL regulator of the POL control system.

An exemplary POL regulator 106 of the POL control system 10 is illustrated in greater detail in FIG. 4. The other POL regulators of FIG. 3 have substantially identical configuration. The POL regulator 106 includes a power conversion circuit 142, a serial interface 144, a POL controller 146, default configuration memory 148, and hardwired settings interface 150. The power conversion circuit 142 transforms an input voltage ($V_I$) to the desired output voltage ($V_O$) according to settings received through the serial interface 144, the hardwired settings 150 or default settings. The power conversion circuit 142 may also include monitoring sensors for output voltage, current, temperature and other parameters that are used for local control and also communicated back to the system controller through the serial interface 144. The power conversion circuit 142 may also generate a Power Good (PG) output signal for stand-alone applications in order to provide a simplified monitoring function. The serial interface 144 receives and sends commands and messages to the system controller 102 via the synch/data and OK/fault serial buses. The default configuration memory 148 stores the default configuration for the POL regulator 106 in cases where no programming signals are received through the serial interface 144 or hardwired settings interface 150. The default configuration is selected such that the POL regulator 106 will operate in a "safe" condition in the absence of programming signals.

The hardwired settings interface 150 communicates with external connections to program the POL regulator without using the serial interface 144. The hardwired settings interface 150 may include as inputs the address setting (Addr) of the POL to alter or set some of the settings as a function of the address (i.e., the identifier or the POL), e.g., phase displacement, enable/disable bit (En), trim, and VID code bits. Further, the address identifies the POL regulator during communication operations through the serial interface 144. The trim input allows the connection of one or more external resistors to define an output voltage level for the POL regulator. Similarly, the VID code bits can be used to program the POL regulator for a desired output voltage/current level. The enable/disable bit allows the POL regulator to be turned on/off by toggling a digital high/low signal.

The POL controller 146 receives and prioritizes the settings of the POL regulator. If no settings information is received via either the hardwired settings interface 150 or the serial interface 144, the POL controller 146 accesses the parameters stored in the default configuration memory 148. Alternatively, if settings information is received via the hardwired settings interface 150, then the POL controller 146 will apply those parameters. Thus, the default settings apply to all of the parameters that cannot be or are not set through hard wiring. The settings received by the hardwired settings interface 150 can be overwritten by information received via the serial interface 144. The POL regulator can therefore operate in a stand-alone mode, a fully programmable mode, or a combination thereof. This programming flexibility enables a plurality of different power applications to be satisfied with a single generic POL regulator, thereby reducing the cost and simplifying the manufacture of POL regulators.

Figure 5:
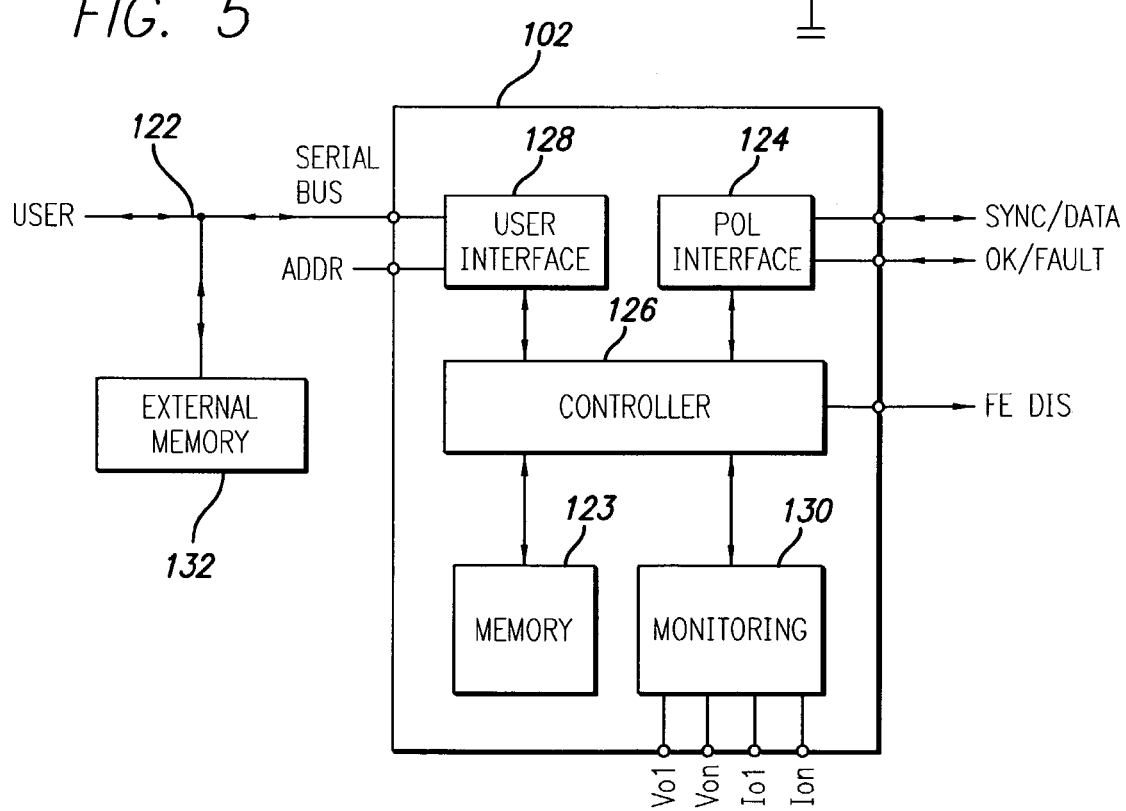
FIG. 5 depicts an exemplary system controller of the POL control system.

An exemplary system controller 102 of the POL control system 100 is illustrated in FIG. 5. The system controller 102 includes a user interface 122, a POL interface 124, a controller 126, and a memory 128. The user interface 122 sends and receives messages to/from the user via the user interface bus. The user interface bus may be provided by a serial or parallel bidirectional interface using standard interface protocols, e.g., an I²C interface. User information such as monitoring values or new system settings would be transmitted through the user interface 122. The POL interface 124 transforms data to/from the POL regulators via the synch/data and OK/fault serial buses. The POL interface 124 communicates over the synch/data serial bus to transmit setting data and receive monitoring data, and communicates over the OK/fault serial bus to receive interrupt signals indicating a fault condition in at least one of the connected POL regulators. The memory 128 comprises a non-volatile memory storage device used to store the system set-up parameters (e.g., output voltage, current limitation set-point, timing data, etc.) for the POL regulators connected to the system controller 102. Optionally, a secondary, external memory 132 may also be connected to the user interface 122 to provide increased memory capacity for monitoring data or setting data.

The controller 126 is operably connected to the user interface 122, the POL interface 124, and the memory 128. The controller 126 has an external port for communication a disable signal (FE DIS) to the front-end regulator 104. At start-up of the POL control system 100, the controller 126 reads from the internal memory 128 (and/or the external memory 132) the system settings and programs the POL regulators accordingly via the POL interface 124. Each of the POL regulators is then set up and started in a prescribed manner based on the system programming. During normal operation, the controller 126 decodes and executes any command or message coming from the user or the POL regulators. The controller 126 monitors the performance of the POL regulators and reports this information back to the user through the user interface 122. The POL regulators may also be programmed by the user through the controller 126 to execute specific, autonomous reactions to faults, such as over current or over voltage conditions. Alternatively, the POL regulators may be programmed to only report fault conditions to the system controller 102, which will then determine the appropriate corrective action in accordance with predefined settings, e.g., shut down the front-end regulator via the FE DIS control line.

A monitoring block 130 may optionally be provided to monitor the state of one or more voltage or current levels of other power systems not operably connected to the controller 102 via the synch/data or OK/fault buses. The monitoring block 130 may provide this information to the controller 126 for reporting to the user through the user interface in the same manner as other information concerning the POL control system 10. This way, the POL control system 10 can provide some backward compatibility with power systems that are already present in an electronic system.

The POL control system 10 enables four different modes of operation. In the first operational mode, the POL regulators function independently in the absence of a system controller and without interaction with other POL regulators. The POL regulators each include local feedback and control systems to regulate their own performance as well as control interfaces to enable local programming. The POL regulators further include default settings in which they can revert to in the absence of local programming or data from the system controller. In other words, each of the POL regulators can operate as a standalone device without the need for a system controller or interactions with another POL regulator.

In the second operational mode, the POL regulators interoperate for the purpose of current sharing or interleaving in the absence of a system controller. The POL regulators communicate with each other over the current share interface. The synch/data line may be used to communicate synchronization information to permit phase interleaving of the POL regulators, in which the phase is programmed locally by entering an address through hardwired connections.

In the third operational mode, the POL regulators operate as an array in which the behavior of each POL regulator and the array as a whole are coordinated by a system controller. The system controller programs the operation of each of the POL regulators over the synch/data serial bus, and thereby overrides the predetermined settings of the POL regulators. The synch/data serial bus is further used to communicate synchronization information to permit synchronization and interleaving of the POL regulators. This operational mode would not include interdevice communications over the current share interface.

Lastly, the fourth operational mode includes both central control using the system controller and local control over certain functionality. This way, the POL regulators operate as an array coordinated by a system controller and also interoperate with each other to perform functions such as current sharing.

It should be appreciated that the POL control system of the present invention provides certain advantages over prior art distributed power distribution systems. The present POL control system requires much less complexity or "glue" components (e.g., mediating devices) in order to provide communication and control of a plurality of POL regulators, thereby reducing the amount of circuit board space for the POL control system and number of control lines needed for communication, control and monitoring. The POL control system is easily scalable by adding POL regulators to the array in order to support additional power requirements, without increasing the overhead requirements.

Having thus described a preferred embodiment of a method and system to control and monitor an array of DC/DC power converters, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A power control system comprising:
   a plurality of point-of-load (POL) regulators;
   at least one serial data bus operatively connecting said plurality of POL regulators; and
   a system controller connected to said at least one serial data bus and adapted to send and receive digital data to and from said plurality of POL regulators;
   wherein, programming, control and monitoring information is carried on said at least one serial data bus between said system controller and said plurality of POL regulators.

2. The power control system of claim 1, wherein said at least one serial data bus further comprises a first data bus carrying said programming, control and monitoring information between said system controller and said plurality of POL regulators.

3. The power control system of claim 2, wherein said at least one serial data bus further comprises a second data bus carrying fault management information between said system controller and said plurality of POL regulators.

4. The power control system of claim 1, further comprising a front-end regulator providing an intermediate voltage to said plurality of POL regulators on an intermediate voltage bus.

5. The power control system of claim 4, wherein said front-end regulator is combined with said system controller in a single device.

6. The power control system of claim 1, wherein said system controller further comprises a user interface adapted to communicate at least one of said monitoring and control information with a user.

7. The power control system of claim 1, wherein each of said plurality of POL regulators further comprise an intradevice interface adapted to communicate interaction information with at least one other one of said plurality of POL regulators.

8. The power control system of claim 7, wherein said interaction information further comprises current sharing information for a parallel operation between ones of said plurality of POL regulators.

9. The power control system of claim 4, wherein said plurality of POL regulators each further comprise a power conversion circuit adapted to transform said intermediate voltage to a desired output voltage.

10. The power control system of claim 1, wherein said plurality of POL regulators each further comprise at least one serial interface adapted to communicate with said at least one serial data bus.

11. The power control system of claim 10, wherein said plurality of POL regulators each further comprise a hardwired interface permitting programming in the absence of data received from said system controller via said serial interface.

12. The power control system of claim 11, wherein said hardwired interface further comprises an input enabling connection of at least one external resistor thereto to define an output voltage of a corresponding one of said plurality of POL regulators.

13. The power control system of claim 11, wherein said hardwired interface further comprises an address interface adapted to receive a unique identification address for each said POL regulator.

14. The power control system of claim 11, wherein said hardwired interface further comprises a VID interface adapted to receive VID codes.

15. The power control system of claim 1, wherein said plurality of POL regulators each further comprises a memory containing default configuration settings to revert to in the absence of data received from said system controller.

16. A method of controlling a plurality of point-of-load (POL) regulators, comprising:
receiving programming parameters;
transmitting serially over a common data bus operably connected to said plurality of POL regulators digital programming data based on said programming parameters; and
receiving performance monitoring information from said plurality of POL regulators over said common data bus.

17. The method of claim 16, wherein said first receiving step further comprises receiving programming parameters from a user.

18. The method of claim 16, wherein said first receiving step further comprises receiving programming parameters from a local memory.

19. The method of claim 16, wherein said first receiving step further comprises receiving programming parameters from an external memory.

20. The method of claim 16, further comprising receiving fault information of said plurality of POL regulators over a second data bus operably connected to said plurality of POL regulators.

21. The method of claim 20, taking common corrective action with respect to plural ones of said plurality of POL regulators in response to a fault of at least one of said POL regulators.

22. The method of claim 17, further comprising storing said received programming parameters in a non-volatile memory.

23. A point-of-load regulator comprising:
a power conversion circuit adapted to convert an intermediate voltage to an output voltage;
a serial data bus interface adapted to communicate programming and monitoring information to and from an external serial data bus connected thereto; and
a controller connected to said serial data bus interface and said power conversion circuit, said controller being adapted to determine operating parameters for said power conversion circuit responsive to said programming information and generate said monitoring information responsive to operational characteristics of said power conversion circuit.

24. The point-of-load regulator of claim 23, further comprising an intradevice interface adapted to communicate interaction information with at least one other POL regulator.

25. The point-of-load regulator of claim 24, wherein said interaction information further comprises current sharing information for a parallel operation with of said at least one other POL regulator.

26. The point-of-load regulator of claim 23, further comprising a hardwired interface coupled to said controller permitting said controller to determine said operating parameters without receiving said programming information from said serial data bus interface.

27. The point-of-load regulator of claim 26, wherein said hardwired interface further comprises an input enabling connection of at least one external resistor thereto to define an output voltage of said power conversion circuit.

28. The point-of-load regulator of claim 26, wherein said hardwired interface further comprises an address interface adapted to receive a unique identification address.

29. The point-of-load regulator of claim 26, wherein said hardwired interface further comprises a VID interface adapted to receive VID codes.

30. The point-of-load regulator of claim 23, further comprising a memory containing default configuration settings to revert to in the absence of said programming information received from said serial data bus interface.

31. The point-of-load regulator of claim 23, further comprising a second serial data interface coupled to said controller, said controller communicating fault status of said power conversion circuit through said second serial data interface.

* * * * *